United States Patent
Tonomura et al.

(10) Patent No.: US 8,779,052 B2
(45) Date of Patent: Jul. 15, 2014

(54) EFFECT PIGMENT-CONTAINING, WATER-BORNE BASE COATING COMPOSITIONS

(75) Inventors: Hironori Tonomura, Nishikamo-gun (JP); Yoshizumi Matsuno, Nishikamo-gun (JP); Yasushi Nakao, Nishikamo-gun (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 356 days.

(21) Appl. No.: 11/992,099

(22) PCT Filed: Oct. 6, 2006

(86) PCT No.: PCT/JP2006/320427
§ 371 (c)(1),
(2), (4) Date: Mar. 14, 2008

(87) PCT Pub. No.: WO2007/043633
PCT Pub. Date: Apr. 19, 2007

(65) Prior Publication Data
US 2009/0087675 A1    Apr. 2, 2009

(30) Foreign Application Priority Data
Oct. 11, 2005 (JP) ................... 2005-296404

(51) Int. Cl.
C08G 18/02 (2006.01)
C09D 5/36 (2006.01)
C09D 133/08 (2006.01)

(52) U.S. Cl.
CPC ............... C09D 133/08 (2013.01); C09D 5/36 (2013.01)
USPC ............ 524/507; 427/385.5; 427/407.1; 523/200; 523/201; 524/437; 524/442; 524/443; 524/444; 524/449; 524/458; 524/460; 524/492; 524/493; 524/502; 524/512; 524/555

(58) Field of Classification Search
USPC .......... 523/200, 201; 524/437, 458, 502, 507, 524/512, 442, 443, 444, 449, 460, 492, 493, 524/555; 427/385.5, 407.1
See application file for complete search history.

(56) References Cited

U.S. PATENT DOCUMENTS

| | | | | | |
|---|---|---|---|---|---|
| 4,346,190 A | * | 8/1982 | Barabas et al. | ............... | 524/522 |
| 4,743,698 A | * | 5/1988 | Ruffner et al. | ............... | 549/478 |
| 6,277,188 B1 | * | 8/2001 | Salter et al. | ................. | 106/403 |
| 6,410,655 B2 | * | 6/2002 | Okubo et al. | .............. | 525/330.1 |
| 6,552,116 B1 | | 4/2003 | Pakusch et al. | | |
| 6,762,240 B2 | * | 7/2004 | Swarup et al. | ................ | 524/560 |
| 2007/0104874 A1 | | 5/2007 | Ogawa et al. | | |

FOREIGN PATENT DOCUMENTS

| | | |
|---|---|---|
| DE | 199 52 671 A1 | 5/2001 |
| EP | 1 371 693 A2 | 12/2003 |
| JP | 2001-104878 | 4/2001 |
| JP | 2002-179988 | 6/2002 |
| JP | 2003-020409 | 1/2003 |
| JP | 2004-351389 | 12/2004 |
| JP | 2004-351390 | 12/2004 |

OTHER PUBLICATIONS

"Roempp Liexicon", Römpp Online, Version 2.13, XP-002438292 (Feb. 2005), Georg Thieme Verlag, RD-05-00191.
"Product information TIOXIDE® R-TC90", Huntsman Pigment Division, XP-002438443 (Apr. 2007) URL: http://ww1.huntsmanservice.com/tds/Pigments/English/Long/R-TC90.pdf.

* cited by examiner

*Primary Examiner* — David W Wu
*Assistant Examiner* — Marie Reddick
(74) *Attorney, Agent, or Firm* — Wenderoth, Lind & Ponack, L.L.P.

(57) ABSTRACT

This invention provides an effect pigment-containing, water-borne base coating composition comprising water-dispersible acrylic polymer particles (A) and effect pigment (B), the water-dispersible acrylic polymer particles (A) being obtained by emulsion polymerization of a radical-polymerizable unsaturated monomeric mixture including an amido-containing, radical-polymerizable unsaturated monomer having at least two radical-polymerizable unsaturated groups per molecule, and the effect pigment (B) being contained at a pigment weight concentration (PWC) within a range of 15-50%.

19 Claims, No Drawings

EFFECT PIGMENT-CONTAINING, WATER-BORNE BASE COATING COMPOSITIONS

TECHNICAL FIELD

This invention relates to water-borne base coating compositions containing specific water-dispersible acrylic polymer particles and specific amount of effect pigment.

BACKGROUND ART

Coating of automobile bodies is generally conducted by applying electrodeposition paint as the undercoat, thereafter applying intermediate coat and further applying top coat thereon.

As application means of the top coat, for example 1-coat-1-bake method comprising applying a top coating paint and heat-curing the same, or 2-coat-1-bake method using two kinds of top coat paint, i.e., a base coating composition and a clear coating composition, which comprises first applying the base coating composition, applying thereon the clear coating composition without curing the base coating film, and simultaneously heat-curing the two coating films, can be named.

Of these methods, in such 2-coat-1-bake system, it has been heretofore widely practiced to improve appearance of the coating film by using as the base coating composition one containing effect pigment such as aluminum flake, mica and the like.

Effect pigment normally has laminar or flaky structure and is oriented in the coating film in parallel with the substrate surface to glitter brightly and change color tone according to viewing directions, whereby forming a coating film of unique color appearance. Of such properties, the one of changing the color tone according to viewing directions is referred to as flip-flop property (FF property), greater changes in color tone signifying higher flip-flop property and better brilliance of the coating film containing the effect pigment.

On the other hand, switching to water-borne paint is promoted in these years for prevention of atmospheric pollution and conservation of resources, and development of effect pigment-containing, water-borne base coating compositions capable of forming coating film exhibiting excellent brilliance is being vigorously attempted.

As a means for improving brilliance of base coating film formed of an effect pigment-containing, water-borne base coating composition, methods for increasing pigment weight concentration (hereafter may be abbreviated as "PWC") of effect pigment in the solid paint content have been investigated. However, when PWC of effect pigment in a water-borne base coating composition is increased, the coating film formed therefrom tends to have deteriorated gloss or surface smoothness, inviting such problems as failure to provide satisfactory finished appearance or reduction in coating film performance such as water resistance.

As a means to deal with the problems, for example, JP 2002-179988A discloses a water-borne base coating composition comprising amido-containing acrylic resin and 15-50 wt % as PWC of aluminum pigment containing 0.1-50 wt % as PWC of aluminum pigment having an average particle size of 17-60 μm. However, brilliance and surface smoothness of the coating film are still insufficient when this water-borne base coating composition is used, and also the coating film performance such as water resistance is unsatisfactory.

JP2004-351390A discloses a coating method comprising recoating on a coating film of water-borne base coating paint containing effect pigment at a relatively low PWC, another water-borne base coating paint containing effect pigment at a relatively high PWC, and further recoating thereon a clear paint, whereby forming a coating film having excellent appearance and brilliance.

Furthermore, JP2004-351389A discloses a coating method comprising recoating on a coating film of water-borne base coating paint containing effect pigment at a relatively low PWC and having a relatively high solid paint content, another water-borne base coating paint containing effect pigment at a relatively high PWC and having a relatively low solid paint content, and further recoating thereon a clear paint, whereby forming a coating film of excellent appearance and brilliance.

However, in either of these coating methods the brilliance and surface smoothness of the resulting coating film are insufficient and the coating film performance such as water resistance is unsatisfactory.

DISCLOSURE OF THE INVENTION

The main object of the present invention is to provide effect pigment-containing, water-borne base coating composition capable of forming coating film of excellent finished appearance such as brilliance and surface smoothness, and coating film performance such as water resistance.

In consequence of concentrative studies, we have now come to discover that the above object can be accomplished by an effect pigment-containing, water-borne base coating composition which comprises specific water-dispersible acrylic polymer particles which are obtained by emulsion polymerizing a radical-polymerizable unsaturated monomeric mixture including amido-containing, radical-polymerizable unsaturated monomer having at least two radical-polymerizable unsaturated groups per molecule, and effect pigment at a pigment weight concentration (PWC) within a range of 15-50%, and completed the present invention.

Thus, the present invention provides an effect pigment-containing, water-borne base coating composition comprising water-dispersible acrylic polymer particles (A) and effect pigment (B), the water-dispersible acrylic polymer particles (A) being obtained by emulsion polymerization of a radical-polymerizable unsaturated monomeric mixture including an amido-containing, radical-polymerizable unsaturated monomer having at least two radical-polymerizable unsaturated groups per molecule, and the effect pigment (B) being contained at a pigment weight concentration (PWC) within a range of 15-50%.

Use of the effect pigment-containing, water-borne base coating composition of the present invention allows easy formation of coating film excelling in finished appearance such as brilliance and surface smoothness and coating film performance such as water resistance.

The reason why such coating film excelling in water resistance and appearance can be formed with the coating composition according to the present invention is presumed to be as follows. Inside the particles of the water-dispersible acrylic polymer (A) obtained with the use of amido-containing, radical-polymerizable unsaturated monomer (M-1) having at least two radical-polymerizable unsaturated groups per molecule, a structure of the amido groups taken into three-dimensional crosslinkages is formed, and because of the relatively uniform presence of amido groups having hydrogen-binding power inside the particles, water can infiltrate into internal parts of the particles in the paint to exhibit high viscosity effect to improve appearance of the coating film; and in the cured coating film, localization of water which permeates into the coating film from outside becomes difficult, to improve water resistance of the film. On the other hand, where an amido-containing, radical-polymerizable unsaturated monomer having only one radical-polymerizable unsaturated group per molecule is used, the amido groups are apt to be localized inside the particles, and are inferred to render appearance and water resistance of the coating film unsatisfactory.

Hereinafter the effect pigment-containing, water-borne base coating compositions of the present invention are explained in further details.

The effect pigment-containing, water-borne base coating compositions of the present invention (which may be hereafter referred to as "present coating compositions") comprise water-dispersible acrylic polymer particles (A), and effect pigment (B) at a pigment weight concentration (PWC) within a range of 15-50%. Preferably the compositions further contain, where necessary, crosslinking agent (C), from the viewpoint of coating film performance.

In the present specification, pigment weight concentration (PWC) of the effect pigment (B) is the mass ratio of the effect pigment (B) to the solid content of the paint.

An effect pigment-containing, water-borne base coating composition according to the present invention can contain water-dispersible acrylic polymer particles (A), in terms of solid content, within a range of 10-100 mass %, preferably 15-80 mass %, inter alia, 20-70 mass %, based on solid resin content of the present coating composition. Also the content of the crosslinking agent (C) can be conveniently within a range of 0-50 mass %, in particular, 10-45 mass %, inter alia, 20-40 mass %, in terms of solid based on solid resin content of the present coating composition.

Here the solid resin content is the combined solid contents of the base resin and crosslinking agent which are contained in the present coating composition and also of other resins which are added where necessary, e.g., phospho group-containing resin.

Water-Dispersible Acrylic Polymer Particles (A):

Water-dispersible acrylic polymer particles (A) used in the present coating composition constitute at least a part of the base resin in the present coating composition. They are water-dispersible acrylic polymer particles which are obtained by emulsion polymerization of a radical-polymerizable unsaturated monomeric mixture including an amido-containing radical-polymerizable unsaturated monomer (M-1) having at least two radical-polymerizable unsaturated groups per molecule. The particles can be obtained by emulsion polymerization of an amido-containing radical-polymerizable unsaturated monomer (M-1) containing at least two radical-polymerizable unsaturated groups per molecule, with one or more other radical-polymerizable unsaturated monomer(s) (M-2).

As specific example of amido-containing radical-polymerizable unsaturated monomer (M-1) having at least two radical-polymerizable unsaturated groups per molecule, for example, $C_{1-6}$ alkylenebis(meth)acrylamide such as N,N'-methylenebis(meth)acrylamide, N,N'-ethylenebis(meth)acrylamide, N,N'-tetramethylenebis(meth)acrylamide and the like; N,N'-1,3-phenylenebisacrylamide; N,N'-(oxymethylene)bis-acrylamide, and the like can be named.

Other radical-polymerizable unsaturated monomers (M-2) are subject to no particular limitation, so long as they are radical-polymerizable with the amido-containing, radical-polymerizable unsaturated monomer (M-1). For example, carboxyl-containing radical polymerizable unsaturated monomer (M-2-1), hydroxyl-containing radical-polymerizable unsaturated monomer (M-2-2), radical-polymerizable unsaturated monomer (M-2-3) having at least two radical-polymerizable unsaturated groups per molecule, other than the amido-containing radical-polymerizable unsaturated monomer (M-1), and the like can be named.

As carboxyl-containing radical-polymerizable unsaturated monomer (M-2-1), for example, unsaturated monocarboxylic acid such as (meth)acrylic acid, crotonic acid and the like; unsaturated dicarboxylic acid such as maleic acid, fumaric acid, itaconic acid and the like and half monoalkyl esterified products of these unsaturated dicarboxylic acids and the like can be named, which can be used each singly or in combination of two or more. Of these, methacrylic acid is preferred from the viewpoint of viscosity-developing property of the coating composition and coating film performance.

As hydroxyl-containing radical-polymerizable unsaturated monomer (M-2-2), for example, $C_{2-10}$-hydroxyalkyl ester of (meth)acrylic acid such as 2-hydroxyethyl(meth)acrylate, 2- or 3-hydroxypropyl(meth)acrylate, 4-hydroxybutyl(meth)acrylate and the like; and N-methylol(meth)acrylamide and the like can be named. Those hydroxyl groups in hydroxyl-containing radical-polymerizable unsaturated monomer (M-2-2) can act as functional groups to react with crosslinking agent (C). These hydroxyl-containing radical-polymerizable unsaturated monomers (M-2-2) can be used each singly or in combination of two or more.

Also as the radical-polymerizable unsaturated monomer (M-2-3) having at least two radical-polymerizable unsaturated groups per molecule, other than the amido-containing radical-polymerizable unsaturated monomer (M-1), for example, ethylene glycol di(meth)acrylate, triethylene glycol diacrylate, tetraethylene glycol dimethacrylate, 1,6-hexanediol diacrylate, allyl(meth)acrylate, divinylbenzene, trimethylolpropane triacrylate and the like can be named, which can be used each singly or in combination of two or more.

Furthermore, those radical-polymerizable unsaturated monomers (M-2-4) other than the above radical-polymerizable unsaturated monomers (M-2-1) to (M-2-3) also can be used. As such, for example, $C_{1-20}$ alkyl ester of (meth)acrylic acid such as methyl(meth)acrylate, ethyl(meth)acrylate, n-propyl(meth)acrylate, i-propyl(meth)acrylate, n-butyl(meth)acrylate, i-butyl(meth)acrylate, t-butyl(meth)acrylate, 2-ethylhexyl(meth)acrylate, cyclohexyl(meth)acrylate, lauryl(meth)acrylate and the like; aromatic vinyl compound such as styrene, α-methylstyrene, vinyltoluene and the like; glycidyl-containing vinyl compound such as glycidyl(meth)acrylate, allyl glycidyl ether and the like; nitrogen-containing alkyl (carbon number=1-20) (meth)acrylate such as dimethylaminoethyl(meth)acrylate and the like; vinyl compound such as vinyl acetate, vinyl propionate, vinyl chloride and the like; polymerizable unsaturated bond-containing nitrile compound such as acrylonitrile, methacrylonitrile and the like; and diene compound such as butadiene, isoprene and the like can be named.

As those other radical-polymerizable unsaturated monomer (M-2), any of above radical-polymerizable unsaturated monomers (M-2-1) to (M-2-4) can be used each singly or in combination of two or more.

As the water-dispersible acrylic polymer particles (A), those obtained by emulsion polymerization of radical-polymerizable unsaturated monomeric mixture comprising an amido-containing radical-polymerizable unsaturated monomer (M-1), carboxyl-containing radical-polymerizable unsaturated monomer (M-2-1) and hydroxyl-containing radical-polymerizable unsaturated monomer (M-2-2) are particularly preferred, among which those formed by using methacrylic acid as the carboxyl-containing radical-polymerizable unsaturated monomer (M-2-1) are most preferred in respect of water resistance of the coating film. The reason is presumably that methacrylic acid shows lower degree of dissociation in water compared to acrylic acid and carboxyl groups which are hydrophilic functional group are more uniformly distributed inside the particles than the case of using acrylic acid, and localization of hydrophilic functional groups is less liable to take place.

The blend ratio of amido-containing radical-polymerizable unsaturated monomer (M-1) in the radical-polymerizable unsaturated monomeric mixture can generally be within a range 0.1-5 mass %, preferably 0.5-4 mass %, inter alia, 1-3.5 mass %, based on the total amount of the radical-polymerizable unsaturated monomers, from the viewpoints of finishing property of the coating film and storage stability of the water-dispersible acrylic polymer particles (A).

Also the blend ratio of carboxyl-containing radical-polymerizable unsaturated monomer (M-2-1) in the radical-polymerizable unsaturated monomeric mixture can generally be within a range of 0.1-20 mass %, preferably 0.5-15 mass %, inter alia, 1-10 mass %, from the viewpoints of appearance and water resistance of coating film. Furthermore, the blend ratio of hydroxyl-containing radical-polymerizable unsaturated monomer (M-2-2) can generally be within a range of 0.1-20 mass %, preferably 1-15 mass %, inter alia, 2-10 mass %, from the viewpoints of curability and water resistance of coating film. Within the above blend ratios, use of methacrylic acid as carboxyl-containing radical-polymerizable unsaturated monomer (M-2-1) is particularly preferred.

Water-dispersible acrylic polymer particles (A) can be obtained by emulsion polymerizing amido-containing radical-polymerizable unsaturated monomer (M-1) with other radical-polymerizable unsaturated monomers (M-2) in the presence of an emulsifier and concurrent presence of radical polymerization initiator.

As the emulsifier, for example, anionic emulsifier such as sodium dialkylsulfosuccinate, sodium dodecylbenzenesulfonate, sodium laurylsulfate, sodium polyoxyethylene alkyl phenyl ether sulfate, sodium alkyl diphenyl ether disulfonate and the like; cationic emulsifier such as lauryltrimethylammonium chloride, stearyltrimethylammonium chloride, alkylbenzyldimethylammonium chloride and the like; and nonionic emulsifier such as polyoxyethylene higher alcohol ether, polyoxyethylene alkyl phenyl ether and the like can be named. Reactive emulsifiers having radical-polymerizable unsaturated group(s) can also be used.

As the emulsifier, use of reactive emulsifier is preferred. In particular, use of anionic reactive emulsifier is preferred in respect of water resistance of the resulting coating film.

As anionic reactive emulsifier, for example, sodium salt or ammonium salt of sulfonic acid compound having radical-polymerizable unsaturated group such as (meth)allyl group, (meth)acrylic group, propenyl group, butenyl group and the like can be named. Because of excellent water resistance of resulting coating film, ammonium salt of sulfonic acid compound having radical-polymerizable unsaturated group is particularly preferred. As commercially available ammonium salt of the sulfonic acid compound, for example, LATEMUL S-180A (tradename, Kao Corporation) can be named.

Of such ammonium salts of sulfonic acid compound having radical-polymerizable unsaturated group(s), those having both radical-polymerizable unsaturated group and polyoxyalkylene group are particularly preferred. As commercially available ammonium salt of sulfonic acid compound having radical-polymerizable unsaturated group and polyoxyalkylene group, for example, AQUALON KH-10 (tradename, Daiichi Kogyo Seiyaku Co.), SR-1025A (tradename, Asahi Denka Industries Co.) and the like can be named.

It is normally convenient to use the emulsifier at a concentration of 0.1-10 mass %, in particular, 1-5 mass %, based on the total amount of radical-polymerizable unsaturated monomers used.

The water-dispersible acrylic polymer particles (A) preferably have multi-layered structure synthesized by multi-stage reaction. More specifically, for example, those having core/shell structure which is a two-layered structure, first core/second core/shell structure which is a three-layered structure and the like can be named. In respect of coating film performance and productivity of water-dispersible acrylic polymer particles (A), particles having core/shell structure which is a two-layered structure are preferred. Of those, particles whose core portions are intraparticulately crosslinked and the shell portions are substantially un-crosslinked are particularly preferred from the viewpoints of coating film performance and finishing property of the coating film.

Water-dispersible acrylic polymer particles (A) having a core/shell structure with intraparticulately crosslinked core portions can be obtained, for example, by first emulsion polymerizing a radical-polymerizable unsaturated monomeric mixture (I) comprising an amido-containing radical-polymerizable unsaturated monomer (M-1) containing at least two radical-polymerizable unsaturated groups per molecule to form the core portions; then adding a radical-polymerizable unsaturated monomeric mixture (II) comprising a carboxyl-containing radical-polymerizable unsaturated monomer (M-2-1); and further continuing the emulsion polymerization to form the shell portions.

Convenient use rate of carboxyl-containing radical-polymerizable unsaturated monomer (M-2-1) in the water-dispersible acrylic polymer particles (A) having such core/shell structure with intraparticulately crosslinked core portions can be: in the first synthesis of the core portions, within a range of normally 0-10 mass %, preferably 0-5 mass %, inter alia, 0-2 mass %, based on the mass of the core-forming radical-polymerizable unsaturated monomeric mixture (I); and in the subsequent synthesis of the shell portions, within the range of normally 5-30 mass %, preferably 7-25 mass %, inter alia, 10-20 mass %, based on the mass of the shell-forming radical-polymerizable unsaturated monomeric mixture (II).

Where the radical-polymerizable unsaturated monomeric mixture (I) contains amido-containing radical-polymerizable unsaturated monomer having at least two radical-polymerizable unsaturated groups per molecule (M-1), the radical-polymerizable unsaturated monomeric mixture (II) preferably contains, in addition to the carboxyl-containing radical-polymerizable unsaturated monomer (M-2-1), an aromatic vinyl compound within a range of normally 2-30 mass %, preferably 5-20 mass %, based on the mass of the radical-polymerizable unsaturated monomeric mixture (II) constituting the shell portions.

As the aromatic vinyl compound, for example, styrene, α-methylstyrene, vinyltoluene and the like can be named, use of styrene being particularly preferred.

It is particularly preferred that the water-dispersible acrylic polymer particles (A) having a core/shell structure with intraparticulately crosslinked cores are those obtained by first emulsion polymerizing a radical-polymerizable unsaturated monomeric mixture (I) containing an amido-containing radical-polymerizable unsaturated monomer (M-1) within a range of normally 0.1-5 mass %, preferably 0.5-4 mass %, inter alia, 0.75-3.5 mass %, based on the mass of the radical-polymerizable unsaturated monomeric mixture (I) which forms the core portions; then adding a radical-polymerizable unsaturated monomeric mixture (II) containing a carboxyl-containing radical-polymerizable unsaturated monomer (M-2-1) within a range of normally 3-30 mass %, preferably 6-25 mass %, inter alia, 11-20 mass % and styrene, within a range of normally 2-30 mass %, preferably 5-20 mass %, inter alia, 11-20 mass %, each based on the mass of the radical-polymerizable unsaturated monomeric mixture (II) for forming the shell portions; and further carrying out the emulsion polymerization.

Where water-dispersible acrylic polymer particles (A) have a two-layered structure, the mass ratio of core/shell is not strictly limited, but it can be conveniently within a range of generally 95/5-50/50, in particular, 85/15-60/40, inter alia, 80/20-65/35, based on the mass of total radical-polymerizable unsaturated monomers used, from the viewpoints of appearance or water resistance of coating film.

As the means to achieve intraparticulate crosslinkage of the water-dispersible acrylic polymer particles, it is also possible to use, for example, a method of concurrently using, in addition to amido-containing radical-polymerizable unsaturated monomer (M-1), a minor amount of radical-polymerizable unsaturated monomer (M-2-3) containing at least two radical-polymerizable unsaturated groups per molecule, other than the amido-containing radical-polymerizable unsaturated monomer (M-1); method of concurrently using each a minor amount of carboxyl-containing radical-polymerizable unsaturated monomer (M-2-1) and glycidyl-containing radical-polymerizable unsaturated monomer; or a method of concurrently using each a minor amount of hydroxyl-containing radical-polymerizable unsaturated monomer (M-2-2) and isocyanate-containing radical-polymerizable unsaturated monomer; or the like.

As the radical polymerization initiator, for example peroxide represented by ammonium persulfate, potassium persulfate, ammonium peroxide and the like; redox initiator formed of combination of these peroxides with reducing agent such as sodium hydrogensulfite, sodium thiosulfate, Rongalit, ascorbic acid and the like; and azo compound such as 4,4'-azobis(4-cyanobutanoic acid) and the like can be named. These radical polymerization initiators can be used normally within a range of 0.01-10 mass %, preferably 0.1-5 mass %, based on the total amount of the radical-polymerizable unsaturated monomers used.

The reaction temperature in the occasion of emulsion polymerization differs depending on the kind of radical polymerization initiator used, while it can be normally within a range of about 60-about 90° C. The reaction time can normally be around 5-10 hours.

Water-dispersible acrylic polymer particles (A) preferably have a hydroxyl value generally within a range of 1-70 mgKOH/g, in particular, 2-60 mg KOH/g, inter alia, 5-50 mgKOH/g, from the viewpoint of water resistance of resulting coating film.

Also from the viewpoints of storage stability or water resistance of coating film, water-dispersible acrylic polymer particles (A) preferably have an acid value generally within a range of 5-90 mgKOH/g, in particular, 10-70 mgKOH/g, inter alia, 15-50 mgKOH/g.

Furthermore, water-dispersible acrylic polymer particles (A) can have an average particle diameter normally within a range of 10-1,000 nm, preferably 20-500 nm, inter alia, 40-350 nm. The average particle diameter of water-dispersible acrylic resin (A) in this invention is the value measured at 20° C., according to coulter counter method. The measurement can be conducted, for example, by using COULTER N4 Model (tradename, Beckmann Coulter Inc.).

Water-dispersible acrylic polymer particles (A) preferably are neutralized with basic compound. The basic compound is preferably water-soluble, examples of which including ammonia; amines such as methylamine, ethylamine, propylamine, butylamine, dimethylamine, trimethylamine, triethylamine, ethylenediamine, morpholine, methylethanolamine, 2-(dimethylamino)ethanol, diethanolamine, triethanolamine, diisopropanolamine, 2-amino-2-methylpropanol and the like. These can be used either singly or in combination of two or more. Among the above-named, use of alkanolamines such as 2-(dimethylamino)ethanol, diethanolamine, triethanolamine and the like is preferred.

Effect Pigment (B):

Effect pigment (B) encompasses pigments which impart to coating film glittering brilliance or interference of light rays, and which preferably are flaky or laminar. As effect pigment (B), for example, aluminum flake pigment, vapor-deposited aluminum flake pigment, metal oxide-coated aluminum flake pigment, colored aluminum flake pigment, mica, titanium oxide-coated mica, iron oxide-coated mica, micaceous iron oxide, titanium oxide-coated silica, titanium oxide-coated alumina, iron oxide-coated silica, iron oxide-coated alumina and the like can be named, which can be used either singly or in combination of two or more.

Effect pigment (B) preferably has an average particle diameter within a range of 3-30 µm, in particular, 5-25 µm. In the present specification, average particle diameter of effect pigment (B) is the median size (d 50) in volumetric particle size distribution as measured by laser diffraction scattering method, which can be measured, for example, with a microtrack particle size distribution measuring device "MT3300" (tradename, NIKKISO Co., Ltd.)

Those effect pigments (B) are also preferably given in advance a dispersing treatment with a treating agent containing phospho groups or sulfo groups, for suppressing hydrogen gas generation. As phospho or sulfo group-containing treating agent, per se known low molecular compound or (co)polymer can be used.

The present coating composition can contain such effect pigment (B) at pigment weight concentration (PWC) within a range of 15-50%, preferably 21-45%, inter alia, 25-35%, from the viewpoint of brilliance and surface smoothness of formed coating film.

Crosslinking Agent (C):

Crosslinking agent (C) may be blended in the present coating composition where necessary. Blendable crosslinking agent (C) is not subject to any specific limitation and, for example, hereafter described amino resin (C-1) and/or blocked polyisocyanate compound (C-2) and the like can be conveniently used. In particular, use of amino resin (C-1) is preferred.

As the amino resin (C-1), for example, partially or wholly methylolated amino resin obtainable through reaction of an amino component such as melamine, urea, benzoguanamine, acetoguanamine, steroguanamine, spiroguanamine, dicyandiamide and the like with aldehyde can be named. As the aldehyde, formaldehyde, paraformaldehyde, acetaldehyde, benzaldehyde and the like can be named. Also such methylolated amino resin whose methylol groups are partially or completely etherified with suitable alcohol can be used, and as the alcohol useful for the etherification, for example, methyl alcohol, ethyl alcohol, n-propyl alcohol, i-propyl alcohol, n-butyl alcohol, i-butyl alcohol, 2-ethylbutanol, 2-ethylhexanol and the like may be named.

As amino resin (C-1), melamine resin is preferred. In particular, at least one alkyl-etherified melamine resin selected from the group consisting of methyl-etherified melamine resin, butyl etherified melamine resin and methyl-butyl-mixed-etherified melamine resin is preferred, which are obtained by partially or completely etherifying methylol groups in methylolated melamine resin with methyl alcohol, butyl alcohol, or methyl alcohol and butyl alcohol, respectively.

The melamine resin generally preferably has a weight-average molecular weight within a range of 800-5,000, in particular, 1,000-4,000.

As commercially available product of such melamine resin, for example, Cymel series such as Cymel 254 of Nihon Cytec Industries Co.; U-VAN series such as U-VAN 20SE of Mitsui Chemicals, Inc. can be named.

When the melamine resin is used as a crosslinking agent (C), sulfonic acid such as paratoluenesulfonic acid, dodecylbenzenesulfonic acid, dinonylnaphthalenesulfonic acid or salts of these acids with amines can be used as the catalyst.

In the present specification, number-average molecular weight and weight-average molecular weight of resins such as those melamine resins, later-appearing acrylic resins, polyester resins and the like are the number-average or weight-average molecular weight measured with gel permeation chromatograph ("HLC 8120GPC", tradename, Tosoh Corporation), as converted based on the number-average or weight-average molecular weight of standard polystyrene. Said gel permeation chromatograph is operated using four columns of "TSKgel G-4000 HXL", "TSKgel G-3000 HXL", "TSKgel G-2500 HXL" and "TSKgel G-2000 HXL" (tradenames, Tosoh Corporation), under the conditions of mobile phase=tetrahydrofuran, measuring temperature=40° C., flow rate=1 mL/min. and the detecter=RI.

Also as the blocked polyisocyanate compound (C-2), for example, polyisocyanate compounds having at least two isocyanate groups per molecule, whose isocyanate groups are blocked with a blocking agent such as oxime, phenol, alcohol, lactam, mercaptan, pyrazole and the like can be named.

Water-Borne Base Coating Compositions:

Water-borne base coating compositions of the present invention can contain as the resin component, besides the water-dispersible acrylic polymer particles (A) and crosslinking agent (C), still other resin component where necessary. As the base resin of such other resin component, those customarily used in water-borne base coating compositions, for example, acrylic resin, polyester resin, urethane resin, epoxy resin and the like can be named. Of these, hereafter described acrylic resin and polyester resin are preferred. These resins can be used either singly or in combination of two or more.

The acrylic resin which can be contained in the present coating compositions, where necessary, is subject to no particular limitation and, for example, acrylic resin obtainable by copolymerization of radical-polymerizable unsaturated monomers by solution polymerization process according to accepted practice can be named. As the organic solvent useful for the solution polymerization, for example, hydrophilic organic solvent of propylene glycol type and dipropylene glycol type are preferred. The acrylic resin preferably contains acid group such as carboxyl group, from the viewpoint of water dispersibility.

The radical-polymerizable unsaturated monomer is subject to no particular limitation. For example, such radical polymerizable unsaturated monomers as those carboxyl-containing radical-polymerizable unsaturated monomers (M-2-1), hydroxyl-containing radical-polymerizable unsaturated monomers (M-2-2) and other radical-polymerizable unsaturated monomers (M-2-4) as described in connection with water-dispersible acrylic polymer particles (A) can be used.

The acrylic resin generally preferably has a weight-average molecular weight within a range of 1,000-200,000, in particular, 2,000-100,000. The acrylic resin also preferably has a hydroxyl value normally within a range of 10-250 mgKOH/g, in particular, 30-150 mgKOH/g, and an acid value normally within a range of 10-100 mg KOH/g, in particular, 20-60 mgKOH/g.

The blend ratio of the acrylic resin is, in terms of solid content, normally within a range of 0-40 mass %, preferably 5-35 mass %, based on the total solid resin content in the present coating composition.

While the polyester resin which may be contained in the present coating composition, where necessary, is subject to no particular limitation, for example, polyester resins which can be synthesized by esterification reaction of polybasic acid with polyhydric alcohol in the accepted manner may be used.

Polybasic acid is a compound having at least two carboxyl groups per molecule, examples of which include phthalic acid, isophthalic acid, terephthalic acid, succinic acid, adipic acid, azelaic acid, sebacic acid, tetrahydrophthalic acid, hexahydrophthalic acid, HET acid, maleic acid, fumaric acid, itaconic acid, trimellitic acid and anhydrides of there acids. Polyhydric alcohol is a compound having at least two hydroxyl groups per molecule, examples of which include ethylene glycol, propylene glycol, butylene glycol, hexanediol, diethylene glycol, dipropylene glycol, neopentyl glycol, triethylene glycol, glycerine, trimethylolethane, trimethylolpropane, pentaerythritol and the like.

It is also possible to use as the polyester resin, fatty acid-modified polyester resins which are obtained by modifying the polyester resins with (semi)drying oil fatty acid such as linseed oil fatty acid, coconut oil fatty acid, safflower oil fatty acid, soybean oil fatty acid, sesame oil fatty acid, perilla oil fatty acid, hemp-seed oil fatty acid, tall oil fatty acid, dehydrated castor oil fatty acid and the like. The preferred degree of modification with these fatty acids is generally not more than 30 mass % in terms of oil length. The polyester resin may also be one in which monobasic acid such as benzoic acid is partially reacted. Furthermore, for the purpose of introducing acid groups into such polyester resin, the product of the esterification reaction of polybasic acid with polyhydric alcohol may be further reacted with polybasic acid or anhydride thereof such as trimellitic acid, trimellitic anhydride or the like.

The polyester resin preferably has a weight-average molecular weight normally within a range of 1,000-200,000, in particular, 2,000-50,000. The polyester resin also preferably has a hydroxyl value within a range of normally 10-250 mgKOH/g, in particular, 30-150 mgKOH/g, and an acid value within a range of normally 10-100 mgKOH/g, in particular, 20-60 mgKOH/g.

Blend ratio of such polyester resin can be normally within a range of 0-40 mass %, preferably 5-35 mass %, based on the total solid resin content of the present coating composition.

The present coating composition may also contain, besides effect pigment (B), pigments such as coloring pigment, extender and the like, where necessary.

As coloring pigment, for example, white pigment such as titanium dioxide, zinc flower and the like; black pigment such as carbon black, acetylene black, lamp black, bone black, graphite, black iron, aniline black and the like; yellow pigment such as yellow iron oxide, Titan Yellow, chrome yellow, chromium oxide, monoazo yellow, condensed azo yellow, azomethine yellow, bismuth vanadate, benzimidazole, isoindolinone, isoindoline, quinophthalone, benzidine yellow, Permanent Yellow and the like; orange pigment such as Permanent Orange; red pigment such as red iron oxide, cadmium red, molybdenum red, Naphthol AS-azo red, anthanthrone, Anthraquinonyl Red, perilene maroon, quinacridone red pigment, diketopyrrolopyrrole, Watching Red, Permanent Red and the like; violet pigment such as cobalt violet, quinacridone violet, dioxazine violet and the like; blue pigment such as cobalt blue, Prussian blue, phthalocyanine blue, threne blue and the like; and green pigment such as phthalocyanine green and the like; other azo pigment, phthalocyanine pigment, quinacridone pigment, isoindoline pigment, threne pigment, perilene pigment and the like can be named. As extender pigment, for example, barium sulfate, barium carbonate, calcium carbonate, aluminum silicate, baryta, gypsum, clay, silica, white carbon, diatomaceous earth, talc, magnesium carbonate, alumina white, Gloss White, mica powder and the like can be named. These may be used each singly or in combination of two or more.

Effect pigment-containing water-borne base coating compositions of the present invention can furthermore be blended with other paint additives which are customarily used for formulation of water-borne paint, such as ultraviolet absorber, light stabilizer, surface treating agent, fine polymer particles, basic neutralizer, antiseptic agent, antirusting agent, silane coupling agent, pigment dispersant, antiprecipitant, thickener, defoaming agent, curing catalyst, anti-degradation agent, anti-sagging agent, water, organic solvent and the like.

As the curing catalyst, for example, organometal compound, acid compound and basic compound can be named. As the organometal compound, for example, metal compounds such as tetraisopropyl titanate, tetrabutyl titanate, lithium acetate, iron (III) acetylacetonate, zinc 2-ethylhexanoate, copper acetate, vanadium trichloride, tin octylate, dibutyltin diacetate, dibutyltin dioctoate, dibutyltin dilaurate, dibutyltin dimaleate, tetrabutyltin, dibutyltin oxide, tetra-n-butyl-1,3-diacetyloxydistannoxane, tetra-n-propyl-1,3-diacetyloxydistannoxane, tetra-2-butyl-1,3-dilauryloxydistannoxane and the like can be named. Of these, organotin compounds such as tin octylate, dibutyltin diacetate, dibutyltin dilaurate and distannoxanes are particularly preferred. Furthermore, when low temperature baking is required, dibutyltin diacetate is conveniently used. As the acid compound, for example, paratoluenesulfonic acid, dodecylbenzenesulfonic acid, dinonylnaphthalenesulfonic acid, dinonylnaphthalenedisulfonic acid, butylphosphoric acid, octylphosphoric acid and the like can be named. Amine-neutralized products of these acids can also be conveniently used. As the basic compound, for example, such compounds as trimethylamine, triethylamine, dimethylcyclohexylamine, N-tetramethylhexane-1,6-diamine, N-pentamethyldiethylenetriamine, 2-methyl-1,4-diazabicyclo[2.2.2]octane and the like can be named.

These compounds named as curing catalyst can be used each singly or in combination of two or more. Use rate of the curing catalyst differing depending on the kind, it is normally suitable to use around 0.05-5 mass parts, per 100 mass parts of the total solid resin content of the coating composition.

As the thickener, for example, inorganic thickeners such as silicate, metal silicate, montmorillonite, organic montmorillonite, colloidal alumina and the like; polyacrylic acid thickener such as sodium polyacrylate, polyacrylic acid-(meth) acrylic acid ester copolymer and the like; urethane associated type thickener which has a urethane bond and polyether chain per molecule and exhibits effective thickening action in an aqueous medium as the urethane bonds mutually associate [as commercially available thickeners of this type, for example, there are UH-814N, UH-462, UH-420, UH-472, UH-540 (tradenames, Asahi Denka Co., Ltd.), SN Thickener 612, SN Thickener 621N, SN Thickener 625N, SN Thickener 627N (tradenames, SUN NOPCO Ltd.) and the like]; cellulose-derived thickeners such as carboxymethyl cellulose, methyl cellulose, hydroxyethyl cellulose and the like; proteinous thickeners such as caseine, sodium caseinate, ammonium caseinate and the like; alginic acid thickeners such as sodium alginate; polyvinyl thickeners such as polyvinyl alcohol, polyvinylpyrrolidone, polyvinylbenzyl ether copolymer and the like; polyether thickeners such as Pluronic polyether, polyether dialkyl ester, polyether dialkyl ether, polyether epoxy-modified product and the like; maleic anhydride copolymer thickeners such as partial ester of vinylmethyl ether-maleic anhydride copolymer and the like; and polyamide thickeners such as polyamide-amine salt and the like can be named. Of these, use of polyacrylic acid thickener and/or urethane associated type thickener is preferred, the latter being particularly preferred. These thickeners can be each used singly or in combination of two or more. Also when such thickener is used, its use rate is normally within a range of 0.1-10 mass parts, in particular, 0.5-8 mass parts, inter alia, 1-5 mass parts, per 100 mass parts of the total resin content of the coating composition.

As the ultraviolet absorber, those known per se, for example, benzotriazole absorber, triazine absorber, salicylic acid derived absorber, benzophenone absorber and the like can be used. When these ultraviolet absorbers are used, their preferred use rate normally ranges 0.1-10 mass parts, in particular, 0.2-5 mass parts, inter alia, 0.3-2 mass parts, per 100 mass parts of the total solid resin content of the coating composition, from the viewpoint of weatherability and yellowing resistance of the coating film.

As the light stabilizer, those known per se can be used, for example, hindered amine light stabilizers. When such a light stabilizer is used, its use rate normally ranges 0.1-10 mass parts, preferably 0.2-5 mass parts, inter alia, 0.3-2 mass parts, per 100 mass parts of the total solid resin content of the coating composition, from the viewpoint of weatherability and yellowing resistance of the coating film.

The present coating composition can be formulated by, for example, preparing an effect pigment concentrate from effect pigment (B) and dispersing resin, e.g., phospho group-containing resin, and organic solvent in advance; and mixing it with above-described other components by a customarily used means.

The present coating composition generally conveniently contains solid paint content of 5-40 mass %, in particular, 5-15 mass %, inter alia, 7-9 mass %, from the viewpoint of brilliance of formed coating film. It is also convenient for the present coating composition to have a pH normally within a range of 7.5-9, in particular, 7.5-8.5.

Where the present coating composition has a relatively low solid content such as 5-15 mass %, in particular, 7-9 mass %, it preferably contains above-described thickener, in particular, the above-named polyacrylic acid thickener and/or urethane associated type thickener, inter alia, the urethane association type thickener, from the viewpoint of such properties of resulting coating film as flip-flap property, brilliance, surface smoothness and the like.

In the present specification, solid content of an effect pigment-containing water-borne base coating composition is the mass ratio of non-volatile component remaining after drying the effect pigment-containing water-borne base coating composition at 110° C. for an hour, which can be calculated by measuring out about 2 g of the effect pigment-containing water-borne base coating composition into an aluminum foil cup of about 5 cm in diameter, spreading it well over the whole bottom area of the cup, drying it at 110° C. for an hour and determining its mass before and after the drying.

Substrate to be Coated:

Substrates to which the present coating composition is applicable is not subject to particular limitations. For example, outer panels of automobile bodies such as of passenger cars, trucks, motorcycles, buses and the like; car parts; and outer panels of household electric appliances such as mobile telephones, audio instruments and the like can be named. In particular, outer panels of automobile bodies and car parts are preferred.

Base materials constituting these substrates are subject to no particular limitation and, for example, metal sheet such as of iron, aluminum, brass, copper, stainless steel, tin plate, galvanized steel, alloyed zinc (Zn—Al, Zn—Ni, Zn—Fe and the like)-plated sheet steel and the like; plastic materials such as resins, e.g., polyethylene resin, polypropylene resin, acrylonitrile-butadiene-styrene (ABS) resin, polyamide resin, acrylic resin, vinylidene chloride resin, polycarbonate resin, polyurethane resin, epoxy resin and the like, and various FRP's; inorganic materials such as glass, cement, concrete and the like; timber; and fibrous materials (paper, fabric) and the like can be used. In particular, metal or plastic materials are suitable.

The substrate may be those made of above-described base materials on which an undercoating film or undercoating plus intermediate coating films are formed. Where the base material is a metal, preferably it is given a chemical conversion treatment with phosphate, chromate or the like in advance of forming undercoating film.

An undercoating film is formed for the purpose of imparting anti-corrosion property, rust preventive property, intimate adhesion to the base material or concealing ability of unevenness on the base material surface (occasionally referred to as "ground-concealing property") to the substrate. As undercoating compositions for forming such undercoating film, those per se known can be used, for example, on conductive base materials such as metals, cationic or anionic electrodeposition coating compositions are preferred, and on low-polarity base materials such as polypropylene, use of chlorinated polyolefin resin-type coating compositions is preferred.

Undercoating compositions may be cured after their application by such means as heating or blasting, or may be dried to an extent not causing curing. Where a cationic or anionic electrodeposition coating composition is used as the undercoating composition, preferably the undercoating composition is heated after application to be cured, for preventing interlayer-mingling between the undercoating film and a coating film successively formed on the undercoating film and for forming a multi-layered coating film of favorable appearance.

An intermediate coating film is formed on the undercoating film, for the purpose of imparting intimate adhesion to undercoating film, ability to conceal color of the undercoating film ("color-concealing property"), ability to conceal unevenness on the undercoating film surface, anti-tipping property and the like.

An intermediate coating film can be formed by applying an intermediate coating composition. Its normally preferred film thickness is within a range of 10-50 µm, in particular, 15-30 µm, in terms of cured film thickness.

As intermediate coating compositions, those per se known can be used, for example, intermediate coating compositions comprising as the vehicle component a base resin such as hydroxyl-containing polyester resin, hydroxyl-containing acrylic resin and the like, and a crosslinking agent such as melamine resin, blocked polyisocyanate and the like can be named.

Intermediate coating film is preferably cured or dried by such means as heating, blasting and the like after application to such an extent that its drying can be sensed with finger touch, to prevent interlayer-mingling with the coating composition to be applied successively onto the intermediate coating film and to form a multi-layered coating film of excellent appearance.

Coating Method:

Method for applying the present coating composition onto a substrate as above-described is subject to no particular limitation and, for example, air spray coating, airless spray coating, rotary atomizing coating or the like can be used. Wet film can be formed on a substrate by such a coating means. These coating methods may be conducted with application of static electricity. In particular, electrostatic coating of rotary atomizing system or of air spray system are preferred, rotary atomizing system electrostatic coating being particularly preferred.

When applied by air spray coating, airless spray coating or rotary atomizing coating, the present coating composition preferably is adjusted of its viscosity in advance, to the level suitable for the coating method, which is normally within a range of around 15-60 seconds as measured at 20° C. with Ford Cup#4 Viscosimeter, suitably using water and/or organic solvent.

Curing of so formed wet coating film can be conducted by heating after applying the present coating composition on the substrate. The heating can be effected by per se known heating means, for example, using a drying oven such as hot air oven, electric oven, infrared induction heating oven or the like. Suitable heating temperature normally ranges from about 80 to about 180° C., preferably from about 100 to about 160° C. While the heating time is not particularly limited, it can normally be around 20-40 minutes.

Suitable film thickness of the present coating composition is, in terms of dry film, normally 5-35 µm, preferably 8-25 µm.

Also a multi-layered coating film can be formed by 2-coat-1-bake system, by applying the present coating composition onto a substrate, applying thereon a clear coating composition without drying the first applied coating film and then simultaneously curing the coating film of the present coating composition and that of the clear coating composition by heating.

In the occasion of forming a multi-layered coating film by the 2-coat-1-bake system, it is preferred to carry out pre-heating after application of the present coating composition at a temperature not causing substantial curing of the coating film, for prevention of occurrence of such coating film defect as cissing. The pre-heating temperature can normally range around 50-100° C., and the pre-heating time, about 30 seconds-10 minutes, preferably about 1-5 minutes.

After applying a clear coating composition onto the resulting uncured base coating film (coating film of the present coating composition) with a coating machine such as rotary atomizing system electrostatic coater, airless spray coater, air spray coater or the like, the two coating films are simultaneously cured by heating normally at about 100-about 180° C., preferably about 120-about 160° C., for about 10-40 minutes, whereby forming a multi-layered coating film of excellent appearance.

Because the use of the present coating composition allows formation of coating film excelling in performance and brilliance, the present coating composition can be conveniently used for automobiles.

In industrial coating lines of automobile bodies, normally the work is separately conducted for each zone using same kind of coating composition(s), whereby to control degradation in coating quality caused by scattered coating composition's sticking on the substrate or coated film. For example, an automobile coating line is generally divided into undercoating zone, intermediate coating zone, base coating zone and clear coating zone.

Also within each of such coating zones, normally the coating operation is divided into two or more steps and a setting time of from about 30 seconds to 3 minutes is provided between the steps to prevent sagging of coating composition and to secure high coating quality. Such coating steps within a same zone are referred to, by the order of being conducted, as the first stage, second stage and so on.

Such a coating process is generally referred to as multistage coating. For example, when coating within a same zone is dividedly conducted in two stages, it is called 2-stage coating, and when it is conducted in three stages, 3-stage coating. Where application of water-borne base coating composition is conducted in a base coating zone, it is preferably conducted by 2-stage coating, from the viewpoint of coating film appearance and coating efficiency.

Where application of a water-borne base coating composition is conducted by such 2-stage coating, the water-borne base coating composition applied in the first stage and that applied in the second stage may be the same or different. In particular, by using different water-borne base coating compositions in the first and second stages, in the first stage applying a water-borne base coating composition (X1) having a solid content of 16-45 mass % and in the second stage, applying a water-borne base coating composition (X2) of the present invention with its solid content adjusted within a range of 5-15 mass %, a coating film exhibiting excellent brilliance and performance can be obtained. (Hereinafter this coating method is referred to as "double base coating method".)

In the double base coating method, preferably the solid content of the water-borne base coating composition (X2) lies within a range of 6-12 mass %, inter alia, 7-9 mass %, from the viewpoint of brilliance of the resulting coating film.

In the double base coating method, furthermore, the interval between the end of the first stage coating and the initiation of the second stage coating preferably is around 30 seconds-3 minutes, without conducting preheating, for energy-saving and productivity improvement.

The water-borne base coating composition (X1) is subject to no particular limitation and per se known water-borne base coating compositions can be used, for example, a base coating composition of the present invention with its solid content adjusted to 16-45 mass %, a water-borne base coating composition according to the present invention whose PWC of effect pigment (B), however, is made less than 15% and whose solid content is adjusted to 16-45 mass %, or the like can be used.

In the double base coating method, preferably the pigment weight concentration (PWC) of effect pigment in water-borne base coating composition (X1) is within a range of 3-30%, in particular, 3-15%, inter alia, 5-10%; and the ratio (P1/P2) between the pigment weight concentration (P1) of effect pigment in water-borne base coating composition (X1) and the pigment weight concentration (P2) of effect pigment in water-borne base coating composition (X2) is within a range of normally (⅕)-(1/1.1), in particular, (1/4.5)-(1/1.5), from the viewpoints of appearance and water resistance of formed coating film.

As the water-borne base coating composition (X1), use of a water borne base coating composition according to the present invention in which PWC of the effect pigment (B) is adjusted to within a range of generally 3-30%, preferably 3-15%, inter alia, 5-10%, and solid content is adjusted to within a range of 16-45 mass % is particularly convenient for forming coating film exhibiting excellent water resistance.

The ratio (T1/T2) between dry film thickness (T1) of water-borne base coating composition (X1) and dry film thickness (T2) of water-borne base coating composition (X2) preferably is within a range of normally (5/1)-(1.5/1), in particular, (4/1)-(2/1). Preferably the dry film thickness (T1) of water-borne base coating composition (X1) generally is within a range of 5-15 µm, in particular, 7-12 µm, and that (T2) of water-borne base coating composition (X2) generally is within a range of 1-5 µm, in particular, 2-4 µm.

In case of applying a clear coating composition onto a base coating film formed by above double base coating method, preferably pre-heating is conducted after the second stage coating, at a temperature not causing substantial curing of the coating film, for prevention of occurrence of coating film defect such as cissing. The pre-heating temperature normally is within a range of about 50-about 100° C., and the pre-heating time, normally 30 seconds-10 minutes, preferably 1-5 minutes.

Onto the uncured effect pigment-containing base coating film as obtained upon the pre-heating, a clear coating composition is applied with rotary atomizing system electrostatic coater, airless spray coater, air spray coater or the like, and thereafter the two coating films are simultaneously cured by heating at about 100-about 180° C., preferably about 120 about 160° C., for about 10-40 minutes, whereby providing a multi-layered film having excellent appearance (brilliance, surface smoothness and so on).

Clear Coating Composition:

As the clear coating composition, for example, those per se known and are customarily used for coating automobile bodies can be used. More specifically, for example, organic solvent-based thermosetting coating compositions, water-borne thermosetting coating compositions, thermosetting powder coating compositions and the like can be named, which contain base resin having crosslinking functional groups such as hydroxyl, carboxyl, epoxy, silanol and the like, such as acrylic resin, polyester resin, alkyd resin, urethane resin, epoxy resin, fluorinated resin and the like; and crosslinking agent as the vehicle component such as melamine resin, urea resin, optionally blocked polyisocyanate compound, carboxyl-containing compound or resin, epoxy-containing compound or resin and the like. Of these, organic solvent-based thermosetting coating composition or water-borne thermosetting coating composition containing carboxyl-containing resin and epoxy-containing resin are preferred. The clear coating composition may be in the form of one-package coating or two-package coating such as two-package type urethane resin coating composition.

The clear coating composition may also contain, to an extent not impairing its transparency, coloring pigment, effect pigment, dye and the like, and moreover suitably other additives such as extender pigment, ultraviolet absorber, defoaming agent, thickener, antirusting agent, surface-treating agent and the like.

Generally preferred thickness of the clear coating film is, in terms of dry film thickness, 15-60 µm, in particular, 20-50 µm, from the viewpoint of appearance of the coating film and coating operability.

EXAMPLES

Hereinafter the invention is explained more specifically, referring to working examples. The invention, however, is in no way limited to these working examples in which parts and percentages are by mass.

Production Examples of Water-Dispersible Acrylic Polymer Particles (A)

Production Example 1

A reactor equipped with a thermometer, thermostat, stirrer, reflux condenser and dropping device was charged with 100 parts of deionized water and 0.5 part of AQUALON KH-10 (note 1), which were mixed by stirring in nitrogen gas current, and the temperature was raised to 80° C. Then 1% of the total amount of the following monomeric emulsion (1) and 10.3 parts of 3% aqueous ammonium persulfate solution were introduced into the reactor and kept at 80° C. for 15 minutes. Thereafter the rest of the monomeric emulsion (1) was dropped into the reactor over 3 hours, and aged for an hour after completion of the dropping. Then the monomeric emulsion (2) as specified in the following was dropped over 2 hours, followed by 1 hour's aging. Thereafter the reaction system was cooled to 30° C. while 42 parts of 5% aqueous 2-(dimethylamino) ethanol solution was slowly added to the reactor and the reaction product was discharged while being filtered with a 100-mesh nylon cloth, to provide water-dispersible acrylic polymer particles (A1) having an average particle diameter of 100 nm [as measured with a submicron particle size distribution measuring instrument, "COULTER N4 Model" (tradename, Beckmann-Coulter, Inc.) of a deionized water-diluted sample at 20° C.], acid value of 33 mgKOH/g, hydroxyl value of 48 mgKOH/g and solid content of 30%.

(note 1) AQUALON KH-10: tradename, polyoxyethylene alkyl ether sulfate ester ammonium salt, DAI-ICHI KOGYO SEIYAKU Co., Ltd.; active ingredient, 97%

Monomeric emulsion (1): Monomeric emulsion (1) was obtained by mixing with stirring 60 parts of deionized water, 1 part of AQUALON KH-10, 3 parts of methylenebisacrylamide, 4 parts of styrene, 13 parts of methyl methacrylate, 30 parts of ethyl acrylate and 20 parts of n-butyl acrylate.

Monomeric emulsion (2): Monomeric emulsion (2) was obtained by mixing with stirring 20 parts of deionized water, 1 part of AQUALON KH-10, 0.1 part of ammonium persulfate, 3 parts of styrene, 6 parts of methyl methacrylate, 2 parts of ethyl acrylate, 4 parts of n-butyl acrylate, 10 parts of 2-hydroxyethyl acrylate and 5 parts of methacrylic acid.

Production Examples 2-8

Production Example 1 was repeated except that in each run the components as indicated in the following Table 1 were used at the indicated blend ratios, to provide water-dispersible acrylic polymer particles (A2)-(A8). Solid concentration, acid values and hydroxyl values of the resulting water-dispersible acrylic polymer particles (A2)-(A8) are shown in Table 1, concurrently with those values of water-dispersible acrylic polymer particles (A1) as obtained in Production Example 1.

TABLE 1

| | | Production Example | | | | | | | |
|---|---|---|---|---|---|---|---|---|---|
| | | 1 | 2 | 3 | 4 | 5 | 6 | 7 | 8 |
| Water-dispersible acrylic polymer particles | | A1 | A2 | A3 | A4 | A5 | A6 | A7 | A8 |
| Deionized water | | | | | 100 | | | | |
| AQUALON KH-10 (note 1) | | 0.5 | 0.5 | | 0.5 | 0.5 | 0.5 | 0.5 | 0.5 |
| Newcol562SN (note 2) | | | | 1.7 | | | | | |
| Deionized water | | | | | 10 | | | | |
| Ammonium persulfate | | | | | 0.3 | | | | |
| Monomeric emulsion 1 | Deionized water | 60 | 60 | 60 | 60 | 60 | 60 | 60 | 55 |
| | AQUALON KH-10 (note 1) | 1 | 1 | | 1 | 1 | 1 | 1 | 1 |
| | Newcol562SN (note 2) | | | 3 | | | | | |
| | methylenebisacrylamide | 3 | 3 | 3 | 3 | 3 | 3 | | |
| | 1,6-Hexanediol diacrylate | | | | | | | 2 | |
| | Acrylamide | | | | | | | 1 | 3 |
| | Methacrylic acid | | 2 | | | | | | |
| | Hydroxyethyl acrylate | | 5 | | | | | | |
| | Styrene | 4 | 4 | 4 | 4 | 4 | 4 | 5 | 10 |
| | Methyl methacrylate | 13 | 12 | 13 | 13 | 13 | 13 | 15 | 20 |
| | Ethyl acrylate | 30 | 34 | 10 | 30 | 30 | 30 | 10 | |
| | n-Butyl acrylate | 20 | 20 | 40 | 20 | 20 | 20 | 37 | 27 |
| Monomeric emulsion 2 | Deionized water | 20 | 10 | 20 | 20 | 20 | 20 | 20 | 25 |
| | AQUAKON KH-10 (note 1) | 1 | 1 | | 0.5 | 0.5 | 0.5 | 1 | 1 |
| | Newcol562SN (note 2) | | | 3 | | | | | |
| | Ammonium persulfate | | | | | 0.1 | | | |
| | Methacrylic acid | 5 | 5 | 5 | 5 | | 5 | 5 | 3 |
| | Acrylic acid | | | | | 5 | | | |
| | Hydroxyethyl acrylate | 10 | 8 | 10 | 3 | 3 | 3 | 10 | 5 |
| | Styrene | 3 | 3 | 3 | 3 | 3 | | 3 | |
| | Methyl methacrylate | 6 | | 6 | 6 | 6 | 6 | 6 | 10 |
| | Ethyl acrylate | 2 | 2 | 2 | 2 | 2 | 2 | 2 | 10 |
| | n-Butyl acrylate | 4 | 2 | 4 | 11 | 11 | 14 | 4 | 12 |
| 5% Aqueous dimethylethanolamine solution | | | | | 42 | | | | |
| Solid concentration (mass %) | | | | | 30 | | | | |
| Acid value (mgKOH/g) | | 33 | 46 | 33 | 33 | 39 | 33 | 33 | 20 |
| Hydroxyl value (mgKOH/g) | | 48 | 63 | 48 | 15 | 15 | 15 | 48 | 24 |

(note 2) Newcol 562SN: tradename, Nippon Nyukazai Co., Ltd.; polyoxyethylene nonyl phenyl ether-sulfuric acid ester sodium salt; effective ingredient = 30%.

Production Example of Acrylic Resin

Production Example 9

A reactor equipped with a thermometer, thermostat, stirrer, reflux condenser and dropping device was charged with 35 parts of propylene glycol monopropyl ether of which temperature was raised to 85° C. Then a mixture of 30 parts of methyl methacrylate, 20 parts of 2-ethylhexyl acrylate, 29 parts of n-butyl acrylate, 15 parts of hydroxyethyl acrylate, 6 parts of acrylic acid, 15 parts of propylene glycol monopropyl ether and 2.3 parts of 2,2'-azobis(2,4-dimethylvaleronitrile) was dropped into the reactor over 4 hours, followed by an hour's aging. Further a mixture of 10 parts of propylene glycol monopropyl ether and 1 part of 2,2'-azobis(2,4-dimethylvaleronitrile) was dropped into the reactor over an hour, again followed by an hour's aging. Further adding 7.4 parts of diethanolamine, an acrylic resin (D1) having a solid content of 55%, weight-average molecular weight of 58,000, acid value of 47 mgKOH/g and hydroxyl value of 72 mgKOH/g was obtained.

Production Example of Polyester Resin

Production Example 10

A reactor equipped with a stirrer, reflux condenser, water-separator and a thermometer was charged with 109 parts of trimethylolpropane, 142 parts of 1,6-hexanediol, 126 parts of hexahydrophthalic anhydride and 120 parts of adipic acid. The temperature of the reactants was raised, consuming 3 hours to raise the temperature from 160° C. to 230° C., and at 230° C. their condensation reaction was conducted for 4 hours. Then 46 parts of trimellitic anhydride was further added for adding carboxyl groups to the resulting condensation reaction product and reacted at 180° C. for 1 hour. Diluting the product with octanol, a polyester resin (E1) having an acid value of 49 mgKOH/g, hydroxyl value of 140 mgKOH/g, solid content of 70% and weight-average molecular weight of 6,400 was obtained.

Production Examples of Effect Pigment Concentrate

Production Example 11

An agitation-mixing vessel was charged with a mixed solvent of 10 parts of ethylene glycol monobutyl ether and 25 parts of octanol, to which 10 parts of an aluminum pigment paste "GX-180A" (tradename; Asahi Kasei Metals Co., Ltd., metal content: 74%) and 5 parts of phospho group-containing resin solution[note 3] were added and mixed by stirring to provide an effect pigment concentrate (B1).

(note 3) Phospho Group-Containing Resin Solution:
A reactor equipped with a thermometer, thermostat, stirrer, reflux condenser and dropping device was charged with a mixed solvent of 27.5 parts of methoxypropanol and 27.5 parts of isobutanol, heated to 110° C., and 121.5 parts of a mixture composed of 25 parts of styrene, 27.5 parts of n-butyl methacrylate, 20 parts of "Isostearyl Acrylate" (tradename, Osaka Organochemical Industry Co., Ltd., a branched higher alkyl acrylate), 7.5 parts of 4-hydroxybutyl acrylate, 15 parts of phospho group-containing polymerizable monomer[note 4], 12.5 parts of 2-methacryloyloxyethyl acid phosphate, 10 parts of isobutanol and 4 parts of t-butyl peroxyoctanoate was added to the mixed solvent consuming 4 hours. Further, a mixture of 0.5 part of t-butyl peroxyoctanoate and 20 parts of isopropanol was dropped over an hour. Thereafter the reaction system was stirred and aged for an hour to provide a phospho group-containing resin solution having a solid content of 50%. The acid value of this resin attributable to the phospho groups was 83 mgKOH/g, the hydroxyl value attributable to 4-hydroxybutyl acrylate was 29 mgKOH/g, and the weight-average molecular weight was 10,000.

(note 4) Phospho Group-Containing Polymerizable Monomer:
A reactor equipped with a thermometer, thermostat, stirrer, reflux condenser and dropping device was charged with 57.5 parts of monobutylphosphoric acid and 41 parts of isobutanol, and after raising the temperature to 90° C., 42.5 parts of glycidyl methacrylate was dropped over 2 hours, followed by an hour's stirring and aging. Then 59 parts of isopropanol was added to provide a phospho group-containing polymerizable monomer solution having a solid content of 50%. Its acid value attributable to the phospho groups was 285 mgKOH/g.

Production Example 12

An agitation-mixing vessel was charged with a mixed solvent of 10 parts of ethylene glycol monobutyl ether and 25 parts of octanol, into which 40 parts of an aluminum pigment paste "GX-180A" and 18 parts of the phospho group-containing resin solution were added, and mixed and stirred to provide an effect pigment concentrate (B2).

Production Example 13

An agitation-mixing vessel was charged with a mixed solvent of 10 parts of ethylene glycol monobutyl ether and 25 parts of octanol, into which 60 parts of an aluminum pigment paste "GX-180A" and 27 parts of the phospho group-containing resin solution were added, and mixed and stirred to provide an effect pigment concentrate (B3).

Production Example 14

An agitation-mixing vessel was charged with a mixed solvent of 10 parts of ethylene glycol monobutyl ether and 25 parts of octanol, into which 7.5 parts of Xirallic T60-10 WNT (tradename, Merck Japan Co., an effect pigment) and 5 parts of the phospho group-containing resin solution were added, and mixed and stirred to provide an effect pigment concentrate (B4).

Production Example 15

An agitation-mixing vessel was charged with a mixed solvent of 10 parts of ethylene glycol monobutyl ether and 25 parts of octanol, into which 30 parts of Xirallic T60-10 WNT and 18 parts of the phospho group-containing resin solution were added, and mixed and stirred to provide an effect pigment concentrate (B5).

Production Example 16

An agitation-mixing vessel was charged with a mixed solvent of 10 parts of ethylene glycol monobutyl ether and 25 parts of octanol, into which 45 parts of Xirallic T60-10 WNT and 27 parts of the phospho group-containing resin solution were added, and mixed and stirred to provide an effect pigment concentrate (B6).

Examples of Water-Borne Base Coating Composition

Example 1

Into an agitation-mixing vessel, 94 parts of effect pigment concentrate (B2) as obtained in Production Example 12 was thrown, and while stirring the same, 38 parts of Cymel 325 (tradename, Nihon Cytec Industries Co., melamine resin, solid content=80%) was added. Further continuing the stirring, 18 parts of the acrylic resin (D1) as obtained in Production Example 9, 43 parts of the polyester resin (E1) as obtained in Production Example 10 and 100 parts of the acrylic resin emulsion (A1) as obtained in Production Example 1 were added to the vessel and mixed. Adding 2-(dimethylamino)ethanol and deionized water to the resulting mixture, a water-borne base coating composition (X-1) having a pH of 8.0 and a solid content of 23% was obtained.

Examples 2-15

Example 1 was repeated except that in each run the components as indicated in the following Table 2 were used at the indicated ratios, to provide water-borne base coating compositions (X-2)-(X-13) and (X1-1)-(X1-2) each having the solid content as indicated in the following Table 2 and pH of 8.0.

Example 16

Into an agitation-mixing vessel, 94 parts of effect pigment concentrate (B2) as obtained in Production Example 12 was thrown, and while stirring the same, 38 parts of Cymel 325 (tradename, Nihon Cytec Industries Co., a melamine resin, solid content=80%) was added. Further continuing the stirring, 57 parts of the polyester resin (E1) as obtained in Production Example 10 and 100 parts of the acrylic resin emulsion (A1) as obtained in Production Example 1 were added and mixed. Adding to the resulting mixture PRIMAL ASE-60 (tradename, Rohm & Haas Co., a polyacrylic acid thickener), 2-(dimethylamino)ethanol and deionized water, a water-borne base coating composition (X2-1) having a pH of 8.0 and a solid content of 14% was obtained.

Examples 17-34

Example 16 was repeated except that in each run the components as indicated in the following Table 2 were used at the indicated ratios, to provide water-borne base coating compositions (X2-2)-(X2-19) each having the solid content as indicated in the following Table 2 and pH of 8.0.

Example 35

Into an agitation-mixing vessel, 94 parts of effect pigment concentrate (B2) as obtained in Production Example 12 was thrown, and while stirring the same, 38 parts of Cymel 325 was added. Further continuing the stirring, 57 parts of polyester resin (E1) as obtained in Production Example 10 and 100 parts of the acrylic resin emulsion (A4) as obtained in Production Example 4 were added to the vessel and mixed. Adding SN Thickener 660T (tradename, SAN NOPCO Ltd., a urethane association type thickener), 2-(dimethylamino) ethanol and deionized water to the resulting mixture, a water-borne base coating composition (X2-20) having a pH of 8.0 and a solid content of 9% was obtained.

Example 36

Example 35 was repeated except that the 94 parts of effect pigment concentrate (B2) as obtained in Production Example 12 was replaced with 83 parts of the effect pigment concentrate (B5) as obtained in Production Example 15, to provide a water-borne base coating composition (X2-21) having a pH of 8.0 and a solid content of 9%.

TABLE 2

| Example | Coating Composition | Water-dispersible acrylic Polymer Particles (A) | | | | | | | | Acrylic Resin | Polyester Resin | Effect Pigment Concentrate | | | | | | Melamine Resin Cymel 325 | Solid Content (%) |
|---|---|---|---|---|---|---|---|---|---|---|---|---|---|---|---|---|---|---|---|
| | | A1 | A2 | A3 | A4 | A5 | A6 | A7 | A8 | D1 | E1 | B1 | B2 | B3 | B4 | B5 | B6 | | |
| 1 | X-1 | 100 | | | | | | | | 18 | 43 | | 94 | | | | | 38 | 23 |
| 2 | X-2 | 100 | | | | | | | | | 57 | | 94 | | | | | 38 | 24 |
| 3 | X-3 | 100 | | | | | | | | | 57 | | | 122 | | | | 38 | 22 |
| 4 | X-4 | 100 | | | | | | | | | 57 | | | | | 83 | | 38 | 25 |
| 5 | X-5 | 133 | | | | | | | | | 57 | | 94 | | | | | 38 | 24 |
| 6 | X-6 | | 100 | | | | | | | | 57 | | 94 | | | | | 38 | 22 |
| 7 | X-7 | | | 100 | | | | | | | 57 | | 94 | | | | | 38 | 24 |
| 8 | X-8 | | | | 100 | | | | | | 57 | | 94 | | | | | 38 | 24 |
| 9 | X-9 | | | | | 100 | | | | | 57 | | 94 | | | | | 38 | 24 |
| 10 | X-10 | | | | | | 100 | | | | 57 | | 94 | | | | | 38 | 24 |
| 11 | X-11 | | | | | | | 100 | | | 57 | | 94 | | | | | 38 | 24 |
| 12 | X-12 | | | | | | | | 100 | | 57 | | 94 | | | | | 38 | 24 |
| 13 | X-13 | | | | | | | | 100 | | 57 | | | | | 83 | | 38 | 25 |
| 14 | X1-1 | 100 | | | | | | | | | 57 | 49 | | | | | | 38 | 25 |
| 15 | X1-2 | 100 | | | | | | | | | 57 | | | | 47 | | | 38 | 26 |
| 16 | X2-1 | 100 | | | | | | | | | 57 | | 94 | | | | | 38 | 14 |
| 17 | X2-2 | 100 | | | | | | | | | 57 | | 94 | | | | | 38 | 11 |
| 18 | X2-3 | 100 | | | | | | | | | 57 | | 94 | | | | | 38 | 9 |
| 19 | X2-4 | 100 | | | | | | | | | 57 | | 94 | | | | | 38 | 8 |
| 20 | X2-5 | 100 | | | | | | | | | 57 | | 94 | | | | | 38 | 6 |
| 21 | X2-6 | | 100 | | | | | | | | 57 | | 94 | | | | | 38 | 9 |
| 22 | X2-7 | | 100 | | | | | | | | 57 | | | 122 | | | | 38 | 9 |
| 23 | X2-8 | | 100 | | | | | | | | 57 | | | | | 83 | | 38 | 9 |
| 24 | X2-9 | | 100 | | | | | | | | 57 | | | | | | 107 | 38 | 9 |
| 25 | X2-10 | | | 100 | | | | | | | 57 | | 94 | | | | | 38 | 9 |
| 26 | X2-11 | | | | 100 | | | | | | 57 | | 94 | | | | | 38 | 9 |
| 27 | X2-12 | | | | 100 | | | | | | 57 | | | 122 | | | | 38 | 9 |
| 28 | X2-13 | | | | 100 | | | | | | 57 | | | | | 83 | | 38 | 9 |

TABLE 2-continued

| Example | Coating Composition | Water-dispersible acrylic Polymer Particles (A) | | | | | | | | Acrylic Resin D1 | Polyester Resin E1 | Effect Pigment Concentrate | | | | | | Melamine Resin Cymel 325 | Solid Content (%) |
|---|---|---|---|---|---|---|---|---|---|---|---|---|---|---|---|---|---|---|---|
| | | A1 | A2 | A3 | A4 | A5 | A6 | A7 | A8 | D1 | E1 | B1 | B2 | B3 | B4 | B5 | B6 | 325 | (%) |
| 29 | X2-14 | | | 100 | | | | | | | 57 | | | | | 107 | | 38 | 9 |
| 30 | X2-15 | | | | 100 | | | | | | 57 | | 94 | | | | | 38 | 9 |
| 31 | X2-16 | | | | | 100 | | | | | 57 | | 94 | | | | | 38 | 9 |
| 32 | X2-17 | | | | | | 100 | | | | 57 | | 94 | | | | | 38 | 9 |
| 33 | X2-18 | | | | | | | 100 | | | 57 | | 94 | | | | | 38 | 9 |
| 34 | X2-19 | | | | | | | 100 | | | 57 | | | | | 83 | | 38 | 9 |
| 35 | X2-20 | | | 100 | | | | | | | 57 | | 94 | | | | | 38 | 9 |
| 36 | X2-21 | | | 100 | | | | | | | 57 | | | | | 83 | | 38 | 9 |

Coating Film Forming Method (Preparation 1 of Test Panels)

Test panels were prepared for each of those water-borne base coating compositions (X-1)-(X-13) as obtained in above Examples 1-13 and water-borne base coating composition (X2-1) as obtained in above Example 16 in the following manner, to carry out evaluation tests.

Preparation of Test Substrate:

A 45 cm-long, 30 cm-wide and 0.8 mm-thick zinc phosphate-treated cold-rolled steel sheet was electrodeposition coated with ELECRON GT-10 (tradename, Kansai Paint Co., Ltd., a thermosetting epoxy resin cationic electrodeposition coating composition) to a dry film thickness of 20 μm, which was heated at 170° C. for 30 minutes and cured. Then an intermediate coating composition, AMILAC TP-65-2 (tradename, Kansai Paint, CO., Ltd., polyester resin-amino resin type organic solvent-based intermediate coating composition) was applied thereonto to a dry film thickness of 40 μm, which was cured by heating at 140° C. for 30 minutes, to provide a test substrate.

Example 35

In a coating environment of temperature 23° C. and humidity 75%, on the above-described test substrate the water-borne base coating composition (X-1) as obtained in Production Example 1 was electrostatically coated with a rotary bell atomizer, ABB Cartridge Bell Coater (tradename, ABB Co.), to a dry film thickness of 15 μm. After an interval of 2 minutes, pre-heating was conducted at 80° C. for 3 minutes, and onto the uncured base coating film surface MAGICRON KINO-1200 (tradename, Kansai Paint Co., Ltd., acrylic resin-type organic solvent-based top clear coating composition) was applied to a dry film thickness of 40 μm. After an interval of 7 minutes, the two coating films were simultaneously cured by heating at 140° C. for 30 minutes, to provide a test panel.

Examples 36-45 and Comparative Examples 1-3

Example 35 was repeated except that the water-borne base coating composition (X-1) and its dry film thickness as in Example 35 were changed in each run as indicated in the following Tables 3 and 4, to provide test panels of Examples 36-45 and Comparative Examples 1-3.

As to those silver metallic colored test panels as obtained in Example 36-44 and Comparative Examples 1-2, their evaluation was conducted by the following test method 1. The results were as shown in Table 3.

(Test Method 1)

Flip-flop property: As to each test panel, L values (value) at receiving angles of 15° and 110° were measured with a multi-angle spectrophotometer MA-68 (tradename, X-Rite Co.) and its FF property was calculated according to the following equation:

$$FF\ value = L\ \text{value at receiving angle of}\ 15°/L\ \text{value at receiving angle of}\ 110°.$$

The greater the FF value, the greater the variation in L value (value) according to observation angle (receiving angle), indicating favorable FF property.

Brilliance: Each test panel was visually observed at varied observation angles, and the panel's brilliance was evaluated according to the following standard:

⊙: remarkable variation in metallic effect according to the angle of visual observation, excellent flip-flop property, nearly no metallic unevenness and very excellent brilliance O: slight metallic unevenness recognizable but remarkable variation in metallic effect according to the angle of visual observation, excellent flip-flop property and good brilliance Δ: variation in metallic effect according to the angle of visual observation is moderate, flip-flop property slightly inferior and slightly inferior brilliance x: variation in metallic effect according to the angle of visual observation is small, inferior flip-flop property and brilliance.

Surface smoothness: Appearance of each test panel was evaluated by visual observation:

⊙: very excellent surface smoothness
O: excellent surface smoothness
Δ: slightly inferior surface smoothness
x: inferior surface smoothness Initial adherability: Each of the multi-layered coating film on each test panel was incised with a cutter to the depth reaching the substrate, to make one-hundred (100) 2 mm×2 mm squares. An adhesive tape was stuck on the incised surface and then rapidly peeled off at 20° C. The number of squares of the coating film remaining on each test panel was counted:

⊙: 100 squares remained, and the edges of incisions with the cutter were smooth
O: 100 square remained but minor peeling observed at the crossing points of the incisions with the cutter
Δ: 99-81 squares remained
x: 80 or less squares remained.

Water-resistant adherability: The test panels were immersed in 40° C. warm water for 10 days, withdrawn, dried at room temperature for 12 hours and were given the squares test similar to the above initial adherability test. The evaluation standard was same to that applied to the initial adherability test.

TABLE 3

Water-borne Base Coating Composition

| | | Coating Composition | Water-dispersible acrylic polymer particles (A) kind | Water-dispersible acrylic polymer particles (A) blended solid content (mass part) | Acrylic resin (D1) blended solid content (mass part) | Polyester resin (E1) blended solid content (mass part) | Melamine resin blended solid content (mass part) | Effect pigment (B) PWC (%) | Solid content (%) | Dry film thickness (μm) |
|---|---|---|---|---|---|---|---|---|---|---|
| Example | 35 | X-1 | A1 | 30 | 10 | 30 | 30 | 21.6 | 23 | 15 |
| | 36 | X-2 | A1 | 30 | — | 40 | 30 | 21.6 | 24 | 15 |
| | 37 | X-3 | A1 | 30 | — | 40 | 30 | 28.1 | 22 | 15 |
| | 38 | X-5 | A1 | 40 | — | 30 | 30 | 21.6 | 22 | 15 |
| | 39 | X-6 | A2 | 30 | — | 40 | 30 | 21.6 | 24 | 15 |
| | 40 | X-7 | A3 | 30 | — | 40 | 30 | 21.6 | 24 | 15 |
| | 41 | X-8 | A4 | 30 | — | 40 | 30 | 21.6 | 24 | 15 |
| | 42 | X-9 | A5 | 30 | — | 40 | 30 | 21.6 | 24 | 15 |
| | 43 | X-10 | A6 | 30 | — | 40 | 30 | 21.6 | 24 | 15 |
| | 44 | X2-1 | A1 | 30 | — | 40 | 30 | 21.6 | 14 | 10 |
| Comparative Example | 1 | X-11 | A7 | 30 | — | 40 | 30 | 21.6 | 24 | 15 |
| | 2 | X-12 | A8 | 30 | — | 40 | 30 | 21.6 | 24 | 15 |

| | | FF Value | Brilliance | Surface smoothness | Initial adherability | Water-resistant adherability |
|---|---|---|---|---|---|---|
| Example | 35 | 3.9 | ○ | ○ | ⊙ | ⊙ |
| | 36 | 3.8 | ○ | ○ | ⊙ | ⊙ |
| | 37 | 4.0 | ○ | ○ | ⊙ | ⊙ |
| | 38 | 3.8 | ○ | ○ | ⊙ | ⊙ |
| | 39 | 3.6 | ○ | ○ | ⊙ | ○ |
| | 40 | 3.6 | ○ | ○ | ⊙ | ○ |
| | 41 | 3.8 | ○ | ○ | ⊙ | ⊙ |
| | 42 | 3.6 | ○ | ○ | ⊙ | ○ |
| | 43 | 3.6 | ○ | ○ | ⊙ | ○ |
| | 44 | 4.6 | ○ | ○ | ⊙ | ⊙ |
| Comparative Example | 1 | 3.2 | × | Δ | ○ | Δ |
| | 2 | 3.1 | × | Δ | ○ | Δ |

Evaluation of the pearly colored test panels as obtained in above Example 45 and Comparative Example 3 was conducted by the following test method 2. The results were as shown in the following Table 4.

(Test Method 2)

Brilliance: Each test panel was visually absorbed at varied observation angles and the panel's brilliance was evaluated according to the following standard:

⊙: large variation in color tone according to the angle of visual observation, very excellent brilliance;

○: relatively large variation in color tone according to the angle of visual observation, good brilliance;

Δ: moderately less variation in color tone according to the angle of visual observation, moderately inferior brilliance;

×: small variation in color tone according to the angle of observation, inferior brilliance.

Surface smoothness, initial adherability and water resistant adherability were evaluated by the same method to above test method 1.

TABLE 4

Water-borne Base Coating Composition

| | | Coating Composition | Water-dispersible acrylic polymer particles (A) kind | Water-dispersible acrylic polymer particles (A) blended solid content (mass part) | Acrylic resin (D1) blended solid content (mass part) | Polyester resin (E1) blended solid content (mass part) | Melamine resin blended solid content (mass part) | Effect pigment (B) PWC (%) | Solid content (%) | Dry film thickness (μm) |
|---|---|---|---|---|---|---|---|---|---|---|
| Example | 45 | X-4 | A1 | 30 | — | 40 | 30 | 21.6 | 25 | 15 |
| Comparative Example | 3 | X-13 | A8 | 30 | — | 40 | 30 | 21.6 | 25 | 15 |

TABLE 4-continued

|  |  | Evaluation |  |  |  |
|---|---|---|---|---|---|
|  |  | Brilliance | Surface smoothness | Initial adherability | Water-resistant adherability |
| Example | 45 | ○ | ○ | ⊙ | ⊙ |
| Comparative Example | 3 | X | Δ | ○ | Δ |

Coating Film-Forming Method (Preparation 2 of Test Panels)

Test panels were prepared for each of those water-borne base coating compositions (X1-1), (X1-2) and (X2-1)-(X2-21) as obtained in above Examples 14-36 in the following manner, to carry out evaluation tests.

Example 46

In coating environment of temperature 23° C. and humidity 75%, the earlier described test substrate was electrostatically coated with the water-borne base coating composition (X1-1) as obtained in Example 14 with a rotary bell atomizer, ABB Cartridge Bell Coater (tradename, ABB Co.) to a dry film thickness of 11 μm, to form the first base coating film. After an interval of 1 minute, the water-borne base coating composition (X2-1) as obtained in Example 16 was applied to a dry film thickness of 4 μm, to form the second base coating film. After an interval of 2 minutes, the coating film was pre-heated at 80° C. for 3 minutes to form an uncured base coating film, onto which MAGICRON KINO-1200 (tradename, Kansai Paint Co., Ltd., acrylic resin-type organic solvent-based top clear coating composition) was applied to a dry film thickness of 40 μm. After an interval of 7 minutes, the two coating films were simultaneously cured by heating at 140° C. for 30 minutes, to provide a test panel.

Examples 47-63, Comparative Examples 4-6

Example 46 was repeated except that the first base coating film was formed by applying the water-borne base coating composition (X1-1) or (X1-2) and thereafter applying any one of water-borne base coating compositions (X2-2)-(X2-21) to form the second base coating film, to produce different combinations and dry film thickness as shown in the following Tables 5 and 6. Thus test panels of Examples 47-63 and Comparative Examples 4-6 were prepared.

As to those silver metallic colored test panels as obtained in Examples 46-58 and Comparative Examples 4-5, their evaluation was conducted by the test method 1. The results were as shown in Table 5.

TABLE 5

| | | Water-borne Base Coating Composition (X1) | | | | | Water-borne Base Coating Composition (X2) | | | | |
|---|---|---|---|---|---|---|---|---|---|---|---|
| | | | Water-dispersible acrylic polymer particles (A) | | | | | Water-dispersible acrylic polymer particles (A) | | | |
| | | Coating Composition | Kind | blended solid content (mass parts) | Effect pigment (B) PWC (%) | Solid Content (%) | Dry film thickness (μm) | Coating Composition | Kind | blended solid content (mass parts) | Effect pigment (B) PWC (%) | Solid Content (%) | Dry film thickness (μm) |
| Example | 46 | X1-1 | A1 | 30 | 6.8 | 25 | 11 | X2-1 | A1 | 30 | 21.6 | 14 | 4 |
| | 47 | X1-1 | A1 | 30 | 6.8 | 25 | 11 | X2-2 | A1 | 30 | 21.6 | 11 | 3 |
| | 48 | X1-1 | A1 | 30 | 6.8 | 25 | 11 | X2-3 | A1 | 30 | 21.6 | 9 | 3 |
| | 49 | X1-1 | A1 | 30 | 6.8 | 25 | 11 | X2-4 | A1 | 30 | 21.6 | 8 | 3 |
| | 50 | X1-1 | A1 | 30 | 6.8 | 25 | 11 | X2-5 | A1 | 30 | 21.6 | 6 | 3 |
| | 51 | X1-1 | A1 | 30 | 6.8 | 25 | 11 | X2-6 | A2 | 30 | 21.6 | 9 | 3 |
| | 52 | X1-1 | A1 | 30 | 6.8 | 25 | 11 | X2-7 | A2 | 30 | 28.1 | 9 | 3 |
| | 53 | X1-1 | A1 | 30 | 6.8 | 25 | 11 | X2-10 | A3 | 30 | 21.6 | 9 | 3 |
| | 54 | X1-1 | A1 | 30 | 6.8 | 25 | 11 | X2-11 | A4 | 30 | 21.6 | 9 | 3 |
| | 55 | X1-1 | A1 | 30 | 6.8 | 25 | 11 | X2-12 | A4 | 30 | 28.1 | 9 | 3 |
| | 56 | X1-1 | A1 | 30 | 6.8 | 25 | 11 | X2-15 | A5 | 30 | 21.6 | 9 | 3 |
| | 57 | X1-1 | A1 | 30 | 6.8 | 25 | 11 | X2-16 | A6 | 30 | 21.6 | 9 | 3 |
| | 58 | X1-1 | A1 | 30 | 6.8 | 25 | 11 | X2-20 | A4 | 30 | 21.6 | 9 | 3 |
| Comparative Example | 4 | X1-1 | A1 | 30 | 6.8 | 25 | 11 | X2-17 | A7 | 30 | 21.6 | 9 | 3 |
| | 5 | X1-1 | A1 | 30 | 6.8 | 25 | 11 | X2-18 | A8 | 30 | 21.6 | 9 | 3 |

| | | | Evaluation | | | |
|---|---|---|---|---|---|---|
| | | FF value | Brilliance | Surface Smoothness | Initial Adherability | Water-resistant adherability |
| Example | 46 | 4.8 | ○ | ○ | ⊙ | ⊙ |
| | 47 | 5.0 | ○ | ○ | ⊙ | ⊙ |
| | 48 | 5.5 | ⊙ | ○ | ⊙ | ⊙ |
| | 49 | 5.4 | ⊙ | ○ | ⊙ | ⊙ |
| | 50 | 5.0 | ○ | ○ | ⊙ | ⊙ |
| | 51 | 5.5 | ⊙ | ○ | ⊙ | ⊙ |

TABLE 5-continued

|  |  |  |  |  |  |  |
|---|---|---|---|---|---|---|
|  | 52 | 5.6 | ⊙ | ○ | ⊙ | ⊙ |
|  | 53 | 5.4 | ○ | ○ | ⊙ | ○ |
|  | 54 | 5.5 | ⊙ | ○ | ⊙ | ⊙ |
|  | 55 | 5.6 | ⊙ | ○ | ⊙ | ○ |
|  | 56 | 5.4 | ○ | ○ | ⊙ | ○ |
|  | 57 | 54 | ○ | ○ | ⊙ | ○ |
|  | 58 | 5.8 | ⊙ | ⊙ | ⊙ | ⊙ |
| Comparative | 4 | 5.2 | ○ | Δ | ○ | X |
| Example | 5 | 5.1 | ○ | Δ | ○ | X |

Evaluation of the pearly colored test panels as obtained in Examples 59-63 and Comparative Example 6 was conducted by the test method 2. The results were as shown in Table 6.

TABLE 6

| | | Water-borne Base Coating Composition (X1) | | | | | | Water-borne Base Coating Composition (X2) | | | | | |
|---|---|---|---|---|---|---|---|---|---|---|---|---|---|
| | | Coating Composition | Kind | Water-dispersible acrylic polymer particles (A) blended solid content (mass parts) | Effect pigment (B) PWC (%) | Solid Content (%) | Dry film thickness (μm) | Coating Composition | Kind | Water-dispersible acrylic polymer particles (A) blended solid content (mass parts) | Effect pigment (B) PWC (%) | Solid Content (%) | Dry film thickness (μm) |
| Example | 59 | X1-2 | A1 | 30 | 6.8 | 26 | 11 | X2-8 | A2 | 30 | 21.6 | 9 | 3 |
|  | 60 | X1-2 | A1 | 30 | 6.8 | 26 | 11 | X2-9 | A2 | 30 | 28.4 | 9 | 3 |
|  | 61 | X1-2 | A1 | 30 | 68 | 26 | 11 | X2-13 | A4 | 30 | 21.6 | 9 | 3 |
|  | 62 | X1-2 | A1 | 30 | 6.8 | 26 | 11 | X2-14 | A4 | 30 | 28.4 | 9 | 3 |
|  | 63 | X1-2 | A1 | 30 | 6.8 | 26 | 11 | X2-21 | A4 | 30 | 21.6 | 9 | 3 |
| Comparative Example | 6 | X1-1 | A1 | 30 | 6.8 | 26 | 11 | X2-15 | A8 | 30 | 21.6 | 9 | 3 |

| | | Evaluation | | | |
|---|---|---|---|---|---|
| | | Brilliance | Surface Smoothness | Initial Adherability | Water-resistant adherability |
| Example | 59 | ○ | ○ | ⊙ | ⊙ |
|  | 60 | ⊙ | ○ | ⊙ | ⊙ |
|  | 61 | ○ | ○ | ⊙ | ⊙ |
|  | 62 | ⊙ | ○ | ⊙ | ○ |
|  | 63 | ⊙ | ⊙ | ⊙ | ⊙ |
| Comparative Example | 6 | Δ | Δ | ○ | X |

The invention claimed is:

1. An effect pigment-containing, water-borne base coating composition comprising water-dispersible acrylic polymer particles (A) and an effect pigment (B) which imparts to a coating film glittering brilliance or interference of light rays, and which is flaky or laminar, the water-dispersible acrylic polymer particles (A) being obtained by emulsion polymerization of a radical-polymerizable unsaturated monomer mixture comprising an amido-containing radical-polymerizable unsaturated monomer (M-1) having at least two radical-polymerizable unsaturated groups per molecule, a carboxyl-containing radical-polymerizable unsaturated monomer (M-2-1) and a hydroxyl-containing radical-polymerizable unsaturated monomer (M-2-2), in the presence of a reactive emulsifying agent which is an ammonium salt of a sulfonic acid compound having radical-polymerizable unsaturated groups, and the effect pigment (B) being contained at a pigment weight concentration (PWC) within a range of 15-50%, wherein the radical-polymerizable unsaturated monomer mixture contains the amido-containing radical-polymerizable unsaturated monomer (M-1) within a range of 0.1-5 mass %, based on the total amount of the radical polymerizable unsaturated monomers.

2. A water-borne base coating composition as set forth in claim 1, in which the radical-polymerizable unsaturated monomer (M-1) is $C_{1-6}$ alkylenebis(meth)acrylamide.

3. A water-borne base coating composition as set forth in claim 1, in which the radical-polymerizable unsaturated monomer mixture further comprises at least one monomer selected from the group consisting of radical-polymerizable unsaturated monomer (M-2-3) having at least two radical-polymerizable unsaturated groups per molecule, other than the amido-containing radical-polymerizable unsaturated monomer (M-1); and other radical-polymerizable unsaturated monomer (M-2-4), other than the amido-containing radical-polymerizable unsaturated monomer (M-1) and the radical-polymerizable unsaturated monomers (M-2-1)-(M-2-3).

4. A water-borne base coating composition as set forth in claim 1, in which the carboxyl-containing radical-polymerizable unsaturated monomer (M-2-1) is methacrylic acid.

5. A water-borne base coating composition as set forth in claim 1, in which the radical-polymerizable unsaturated monomer mixture contains the carboxyl-containing radical-polymerizable unsaturated monomer (M-2-1) within a range of 0.1-20 mass %, based on the total amount of the radical-polymerizable unsaturated monomers.

6. A water-borne base coating composition as set forth in claim 1, in which the radical-polymerizable unsaturated monomer mixture contains the hydroxyl-containing radical-polymerizable unsaturated monomer (M-2-2) within a range of 0.1-20 mass %, based on the total amount of the radical-polymerizable unsaturated monomers.

7. A water-borne base coating composition as set forth in claim 1, in which the water-dispersible acrylic polymer particles (A) are multi-layer structured water-dispersible acrylic polymer particles, which are obtained by emulsion polymerizing the radical-polymerizable unsaturated monomer mixture through a multi-stage reaction.

8. A water-borne base coating composition as set forth in claim 7, in which the water-dispersible acrylic polymer particles (A) are water-dispersible acrylic polymer particles having core/shell two-layered structure.

9. A water-borne coating composition as set forth in claim 8, in which the core portion(s) is crosslinked and the shell portion(s) is un-crosslinked.

10. A water-borne base coating composition as set forth in claim 9, in which the water-dispersible acrylic polymer particles (A) are obtained by first emulsion polymerizing radical-polymerizable unsaturated monomer mixture (I) comprising amido-containing radical-polymerizable unsaturated monomer (M-1) having at least two radical-polymerizable unsaturated groups per molecule to form the core portion(s); adding radical-polymerizable unsaturated monomer mixture (II) comprising carboxyl-containing radical-polymerizable unsaturated monomer (M-2-1); and further emulsion polymerizing to form the shell portion(s).

11. A water-borne base coating composition as set forth in claim 1, in which the water-dispersible acrylic polymer particles (A) have a hydroxyl value within a range of 1-70 mgKOH/g.

12. A water-borne base coating composition as set forth in claim 1, in which the water-dispersible acrylic polymer particles (A) have an acid value within a range of 5-90 mgKOH/g.

13. A water-borne base coating composition as set forth in claim 1, in which the water-dispersible acrylic polymer particles (A) have an average particle diameter within a range of 10-1000 nm.

14. A water-borne base coating composition as set forth in claim 1, which contains the effect pigment (B) which imparts to a coating film glittering brilliance or interference of light rays, and which is flaky or laminar, at a pigment weight concentration (PWC) within a range of 21-45%.

15. A water-borne base coating composition as set forth in claim 1, which further contains a crosslinking agent (C).

16. A water-borne base coating composition as set forth in claim 15, in which the crosslinking agent (C) is an amino resin or a blocked polyisocyanate compound, or, an amino resin and a blocked polyisocyanate compound.

17. A water-borne base coating composition as set forth in claim 1, having a solid content within a range of 5-15 mass % based on the total mass of the composition.

18. A multi-layered coating film-forming method which comprises applying onto a substrate a water-borne base coating composition as set forth in claim 1, to form uncured base coating film, applying a clear coating composition onto the uncured base coating film to form a clear coating film, and thereafter heat-curing the base coating film and clear coating film simultaneously.

19. Articles coated by the method as set forth in claim 18.

* * * * *